United States Patent
Wilson

(10) Patent No.: US 8,374,712 B2
(45) Date of Patent: Feb. 12, 2013

(54) GAPLESS AUDIO PLAYBACK

(75) Inventor: Mei Wilson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1078 days.

(21) Appl. No.: 12/347,568

(22) Filed: Dec. 31, 2008

(65) Prior Publication Data

US 2010/0165815 A1   Jul. 1, 2010

(51) Int. Cl.
*G06F 17/00* (2006.01)

(52) U.S. Cl. .......... 700/94; 709/231; 719/318; 719/321; 719/322; 719/327; 719/330

(58) Field of Classification Search .................. 700/94
See application file for complete search history.

(56) References Cited

U.S. PATENT DOCUMENTS

| | | | |
|---|---|---|---|
| 6,209,041 B1* | 3/2001 | Shaw et al. | 719/321 |
| 6,557,067 B1 | 4/2003 | James et al. | |
| 6,625,387 B1 | 9/2003 | Blair et al. | |
| 6,785,369 B2 | 8/2004 | Diamond et al. | |
| 2002/0028062 A1* | 3/2002 | Wu | 386/80 |
| 2005/0149946 A1* | 7/2005 | Evans | 719/318 |
| 2006/0104397 A1* | 5/2006 | Lottis et al. | 375/372 |
| 2007/0011343 A1* | 1/2007 | Davis et al. | 709/231 |
| 2008/0065393 A1 | 3/2008 | Kincaid | |
| 2008/0162716 A1 | 7/2008 | Kayanuma et al. | |
| 2008/0215746 A1 | 9/2008 | Agarwal et al. | |

OTHER PUBLICATIONS

Yamaha DME designer system manual: copyright 2004.*
"Zune Gapless Playback Arrives", retrieved at <<http://www.ubergizmo.com/15/archives/2008/05/zune_gapless_playback_arrives.html>>, May 5, 2008, p. 1-4.
"iTunes—Determining Gapless Playback Information", retrieved at <<http://i.nconspicuo.us/2006/11/16/itunes-determining-gapless-playback-information/>>, Nov. 16, 2006, p. 19.
"Welcome to @MAX Software Website", retrieved at <<http://www.atmaxsoft.com/>>, Oct. 23, 2008, p. 1-3.

* cited by examiner

*Primary Examiner* — Paul McCord
(74) *Attorney, Agent, or Firm* — Alleman Hall McCoy Russell & Tuttle LLP

(57) ABSTRACT

Various embodiments related to the performance of gapless audio playback of two or more audio tracks are provided. One disclosed embodiment provides a method of performing gapless audio playback comprising rendering a plurality of samples of a current audio track via a current filter graph, and notifying an end-of-stream soon event via a current filter graph. Upon detecting the end-of-stream soon event, a next filter graph corresponding to a next audio track is pre-rolled and then paused. An end-of-stream event is notified at the current filter graph signaling an end of the current audio track. Then, upon detecting an end-of-stream event, the next filter graph is signaled to begin rendering samples of the next audio track.

20 Claims, 5 Drawing Sheets

GAPLESS AUDIO PLAYBACK

BACKGROUND

Digital media content may be enjoyed on a variety of different devices, including but not limited to personal computers and portable media players. Portable media players may utilize solid state memory or hard drives that allow very large numbers of media content items to be compactly stored and easily accessed.

However, the playback of compressed media data via such a portable media player may have various shortcomings compared to the playback of the same media data in its native format on a compact disc or the like. For example, solid state or hard drive-based portable media players may introduce pauses between tracks that do not exist in the native format of the media item. Likewise, some audio compression formats may utilize fixed-length compression samples. In this case, the end of a compressed audio track may contain a segment of quiet space to fill out the last sample in the song. When the audio track is played, such compression artifacts may cause gaps of silence that may be disruptive to a listener and interfere with the music listening experience. Additionally, latency between tracks may also contribute to pauses between tracks in both compressed and uncompressed media data.

SUMMARY

Various embodiments related to gapless audio playback are disclosed herein. For example, one disclosed embodiment provides a method of gapless playback of audio tracks. The method comprises rendering a plurality of samples of a current audio track via a current filter graph, and notifying an end-of-stream soon event via a current filter graph. Upon detecting the end-of-stream soon event, a next filter graph corresponding to a next audio track is pre-rolled and then paused. An end-of-stream event is notified at the current filter graph signaling an end of the current audio track. Then, upon detecting an end-of-stream event, the next filter graph is signaled to begin rendering samples of the next audio track.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
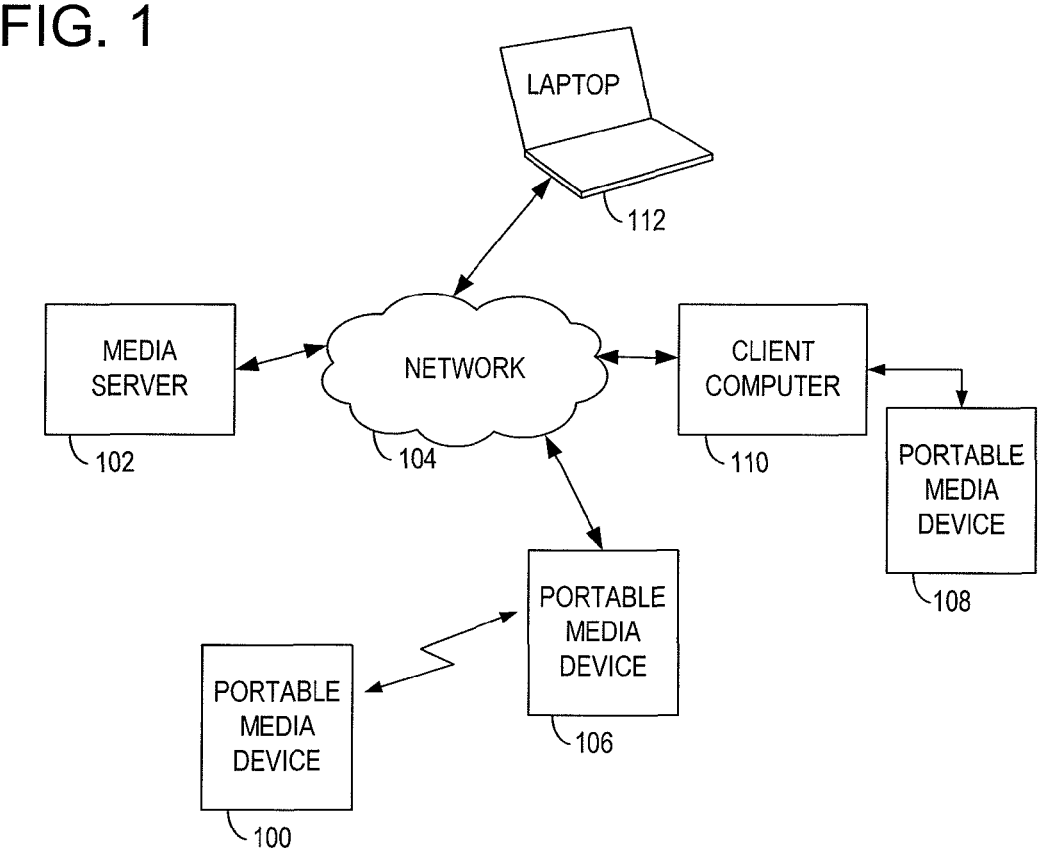
FIG. 1 shows a block diagram of an embodiment of a use environment for a portable media device.

FIG. 1 illustrates a block diagram of an embodiment of a use environment for a portable media device. A portable media device may be used to store, play, download and/or organize media content such as audio and/or video content. In some cases, portable media device 100 may access such media content on a network-accessible media server 102 via a network 104. In other cases portable media device 100 may access media content on another portable media device 106 via a wireless radio connection and/or hardwire connection to portable media device 106. In yet other cases, portable media device 108 may access media content on a media server 102 via a client computer 110 configured to access media server 102 via network 104. Client computer 110 and/or laptop 112 may also be used to store, play, download and/or organize media content. It will be understood that the use environment of FIG. 1 is shown for the purpose of example, and that a media player may be used in any other setting or environment. Further, it will be understood that the term "portable media device" may comprise any suitable device capable of storing and playing back audio tracks, including but not limited to portable handheld media players, cell phones, personal digital assistants, global positioning system (GPS) devices, laptop computers, etc.

Figure 2:
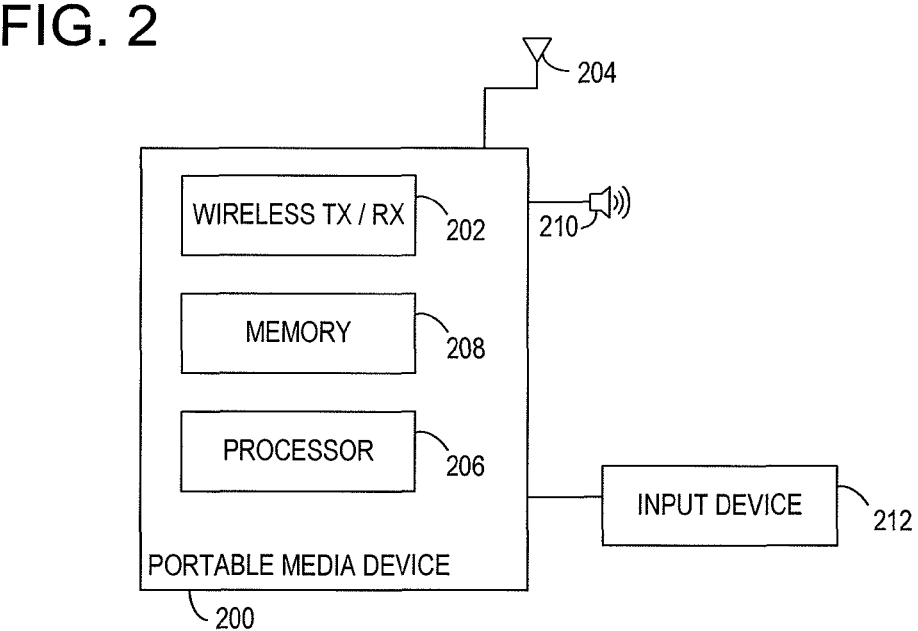
FIG. 2 shows a block diagram of an embodiment of a portable media device.

FIG. 2 illustrates a block diagram of an embodiment of a portable media device 200. Portable media device 200 includes a wireless transmit/receive (TX/RX) module 202 configured to coordinate with antenna 204 to transmit and/or receive data via a wireless radio connection. Portable media device 200 further includes processor 206 and memory 208 comprising instructions executable by processor 206 to operate the portable media player and to perform the gapless audio playback methods described herein. Portable media device 200 further includes an audio output, such as an output jack connectable to a set of headphones or other speaker 210, to output sound. As further shown in FIG. 2, portable media device 200 may include an input device 212 to allow a user to interact with portable media device 200. For example, input device 212 may comprise a touchpad, touch-sensitive display, one or more buttons, etc. It will be understood that the embodiment of FIG. 2 is shown for the purpose of example, and is not intended to be limiting in any manner. For example, in other embodiments, a portable media device may not include wireless communications capabilities.

Figure 3:
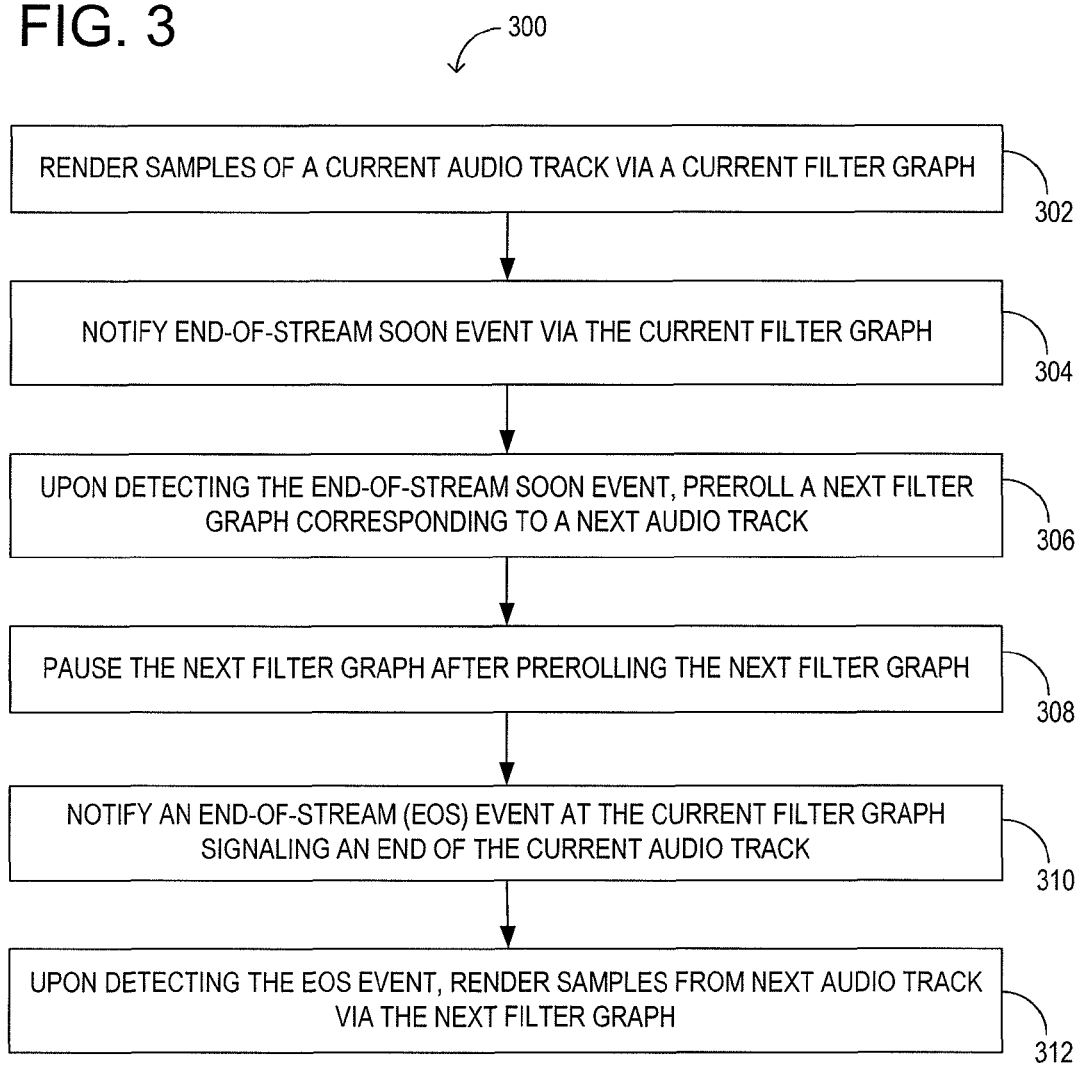
FIG. 3 shows a flow diagram of an embodiment of a method of gapless playback of two or more audio tracks on a portable media device.

FIG. 3 illustrates a flow diagram of an embodiment of a method 300 of performing gapless playback of two or more audio tracks on a portable media device or other suitable device. As described above, some audio tracks may be part of an audio album that is to be played continuously without gaps of silence between audio tracks. The presence of such gaps may interrupt the listening experience, and may result in playback that is not true to the original artistry of the composer.

Such gaps may be introduced by the way a media player handles the playback of audio tracks. For example, some media players utilize separate filter graphs for each audio track played. A filter graph is an architecture that represents a flow of audio data between a series of "filters" that each represents a stage in the processing of a digital audio track. For example, as described in more detail below, a filter graph may comprise a source filter that sources an audio track, a decoder filter that decodes the track, and an audio renderer filter that renders the decoded track for playback.

Where separate filter graphs are used for each audio track, rolling a next filter graph for a next audio track may take a period of time that is noticeable to a listener. Therefore, if a next filter graph is rolled at the conclusion of a current audio track played by a current filter graph, a noticeable lag may exist between the tracks. Method 300 is configured to solve such issues in a manner that is agnostic to the audio data file format of the tracks being played, and that may be performed efficiently with the amount of memory and processing power available on a portable media player.

First, at 302, method 300 includes rendering a plurality of samples of a current audio track via a current filter graph. Such samples may be, for example, pulse-code modulated (PCM) samples, or may be in any other suitable format. Then, at some point during playback of the current audio track, method 300 includes, at 304, notifying an end-of-stream soon event via a current filter graph. The end-of-stream soon event indicates that the current audio track is about to end. In some cases, the end-of-stream event may be notified, for example, as early as 6 to 15 seconds before the current audio track ends, or in other cases as little as 200 ms before the current audio track ends, depending on the file format of the current audio track.

The end-of-stream soon event may comprise any suitable event that can provide notice of the upcoming end of an audio track. For example, in one specific embodiment, the source filter of a current filter graph playing the current audio track issues an end-of-stream soon warning when it detects sending of the last sample of the current audio track from the source filter to the decoder filter. In this embodiment, some time lag exists between the sourcing of the last sample and the rendering of the last sample, which allows an estimate of the time between the end-of-stream soon event and the end of the audio track to be determined. This is described in more detail below.

Next, at 306 method 300 includes, upon detecting the end-of-stream soon event, pre-rolling a next filter graph corresponding to a next audio track. Pre-rolling a next filter graph allows samples of the next audio track to be queued up in the next filter graph prior to the end of the current audio track. Such pre-rolling may include any suitable processes for preparing the next filter graph to play the next audio track. Such processes may include, but are not limited to, one or more of notifying a source filter of the next filter graph to begin sending source data to a decoder filter of the next samples filter graph, decoding received at the decoder filter of the next filter graph, and sending the samples to an audio renderer filter of the next filter graph. Such pre-rolling also may comprise removing a compression artifact from a first sample of the next audio track, as described in more detail below. An advantage of pre-rolling the next filter graph before the current filter graph ends is that any delay caused by starting the next filter graph may be reduced or eliminated. In contrast, without such pre-rolling, queuing the next filter graph when the current filter graph ends may take long enough to cause a gap of silence due to the media pipeline delay, thus potentially interrupting the user listening experience.

Next, at 308 method 300 includes pausing the next filter graph after pre-rolling the next filter graph until, at 310, an end-of-stream event is notified at the current filter graph signaling an end of the current audio track. The end-of-stream event may be any event suitable to indicate that the end of the current audio track has been reached. For example, in one specific embodiment, the end-of-stream event corresponds to the receipt of a last audio sample of the current audio track at the audio renderer filter of a current filter graph. Further, in some embodiments, an end-of-stream event may trigger an audio renderer filter to set a "gapless audio event," as described in more detail in the description of FIG. 6. Next, at 312 method 300 includes, upon detecting the end-of-stream event, rendering a plurality of samples of the next audio track via the next filter graph. Thus, playback of the next audio track commences.

Figure 4:
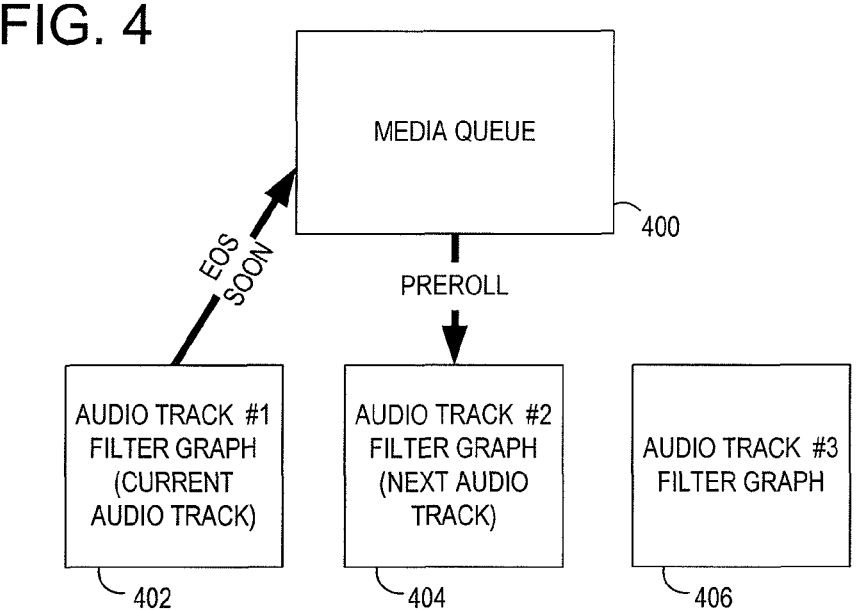
FIG. 4 shows a block diagram depicting an embodiment of a software architecture of a portable media device, and depicting an interaction of a media queue with a filter graph corresponding to a current audio track.

In some embodiments of method 300, a media queue may be used to interact with filter graphs corresponding to the audio tracks to be played, and to coordinate the order in which those audio tracks are played. In other embodiments, any other suitable playlist management component other than a media queue may be used. FIG. 4 shows a block diagram depicting an embodiment of a software architecture of a portable media device, and also depicting an interaction of a media queue 400 with a filter graph 402 corresponding to a current audio track. FIG. 4 shows media queue 400 receiving an end-of-stream soon event from a current filter graph 402. Upon receiving the end-of-stream event, media queue 400 pre-rolls a next filter graph 404 corresponding to a next audio track.

Figure 5:
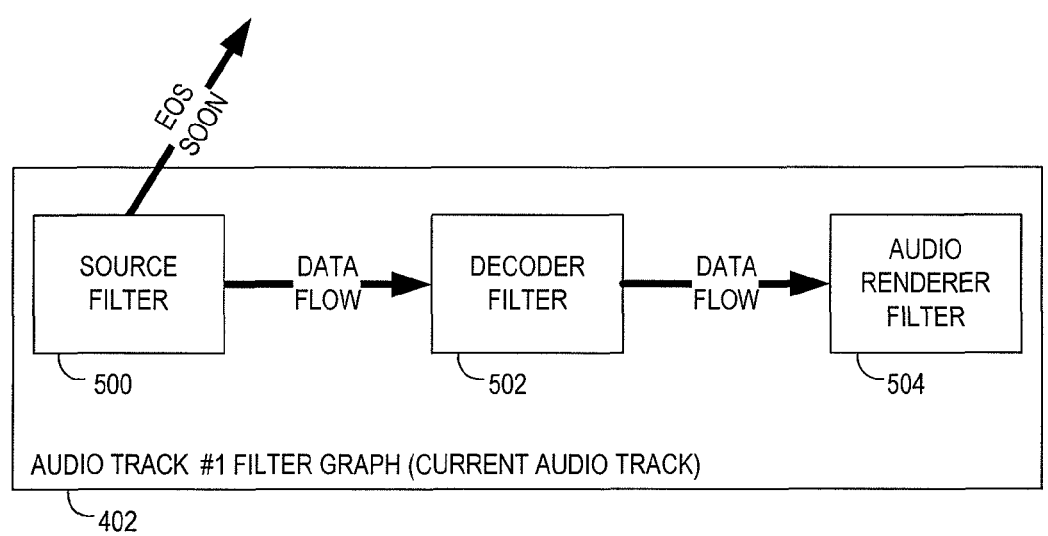
FIG. 5 shows a block diagram of the filter graph of FIG. 4.

FIG. 5 shows a block diagram of filter graph 402 corresponding to a current audio track of FIG. 4. As described above for method 300, a source filter 500 may be used to send source data to be decoded at a decoder filter 502 to then be rendered at audio renderer filter 504. In one embodiment, the sending of the last source data from source filter 500 to decoder filter 502 may correspond to the end-of-stream soon event.

Figure 6:
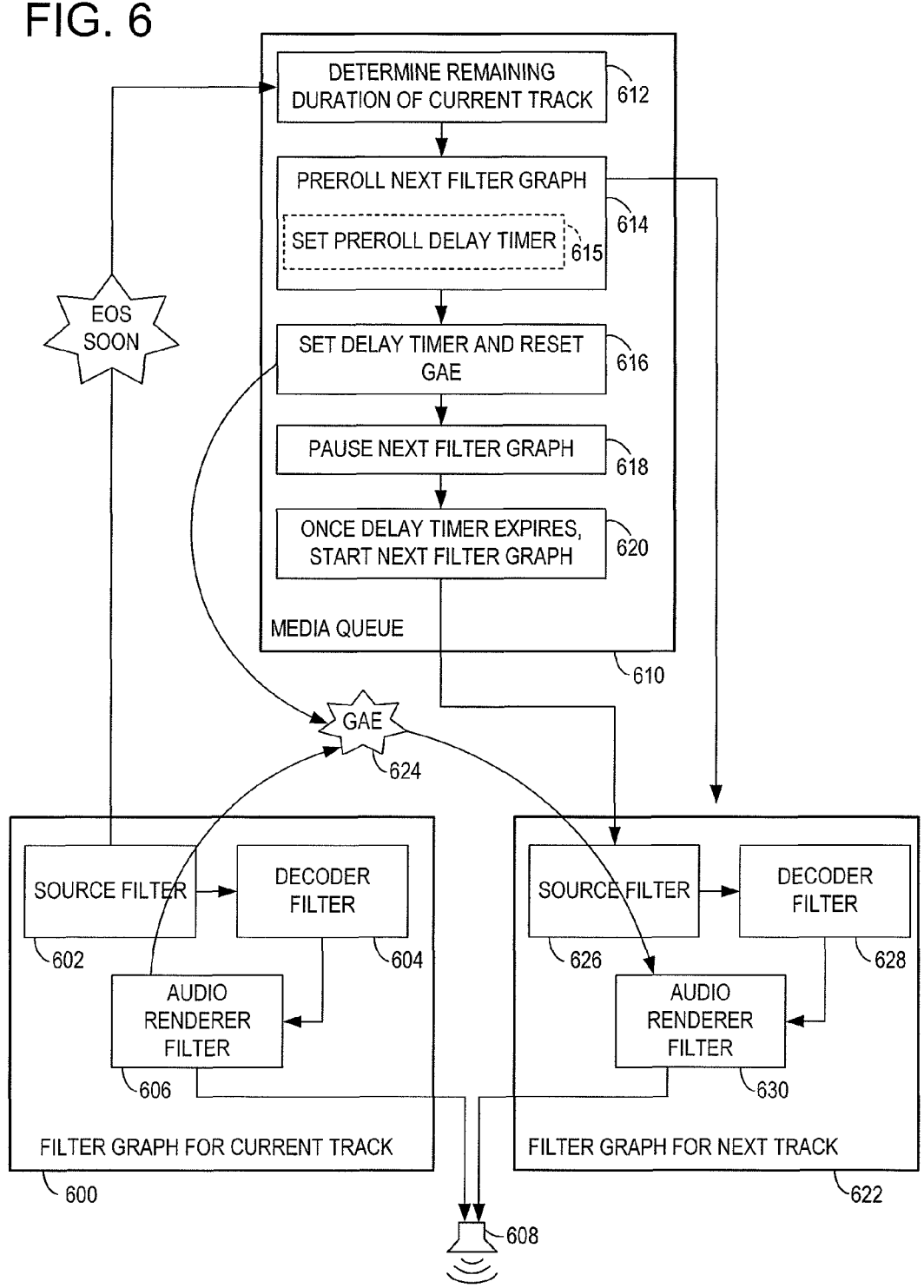
FIG. 6 shows a graphical depiction of an embodiment of a method of gapless playback of two or more audio tracks on a portable media device.

FIG. 6 shows a graphical depiction of another embodiment of a method of gapless playback of audio tracks on a portable media device. In such an embodiment, a media queue, delay timer and a gapless audio event may be used to coordinate the rendering of a last sample of a current audio track followed by a first sample of the next audio track. One advantage of such an embodiment is that the use of a timer and gapless audio event may help to reduce any delay at the execution of the next filter graph, yielding a gapless transition.

As shown in FIG. 6, a current filter graph 600 corresponding to a current audio track may process samples of the current audio track by sending the samples from source filter 602 to decoder filter 604 and then to audio renderer filter 606. Audio renderer filter 606 may then render the samples to a speaker 608 to convert the rendered audio data into sound. Upon source filter 602 sending a last sample to decoder filter 604, source filter 602 may detect an end-of-stream soon event and notify media queue 610 that the current audio track is about to end.

As shown at 612, upon detecting an end-of-stream soon (EOS Soon) event via current filter graph 600, media queue 610 may then determine a remaining duration of the current audio track. Further, media queue 610 may verify that the current audio track is an audio track, and may then identify a next audio track that is to follow the current audio track. By verifying that the current audio track is actually an audio track, rather than a video track or other media track in which gaps between selections may be desired, unwanted gapless playback may be avoided.

As shown at 614, upon detecting the end-of-stream soon event, media queue 610 may pre-roll the next filter graph 622 corresponding to the next audio track. In some embodiments, as depicted at 615, a preroll delay timer may be set upon determining the remaining duration of the current audio track at 612. In such embodiments, the preroll delay timer may be set for a predetermined preroll delay amount, and pre-rolling the next filter graph commences upon the expiration of the preroll delay timer. In one specific embodiment, the predetermined preroll delay amount is two seconds. In other embodiments, the predetermined preroll delay amount may have any other suitable value. Further, media queue 610 may start a delay timer, as shown at 616, for a period based upon the remaining duration of the current audio track. The delay timer may be used to control a pause duration of the next filter graph, as described below. In some embodiments, the period based upon the remaining duration may be a period equal to the remaining duration minus a predetermined delay. In some embodiments the predetermined delay may be a delay of between 300-500 ms. Additionally, 616 further comprises resetting a gapless audio event (GAE) 624. Resetting the gapless audio event 624 allows for the gapless audio event 624 to be set at a later time by audio renderer filter 606, as discussed hereafter.

As shown at 618, media queue 610 pauses the next filter graph 622 such that samples of the next audio graph are not yet sent from the source filter 626. As shown at 620, upon the timer expiring, media queue 610 will then start the next filter graph 622 such that samples may be sent from the source filter 626 to decoder filter 628 and on to audio renderer filter 630. However, audio renderer filter 630 does not yet render any samples. By pausing the next filter graph for the predetermined delay, memory and other computing resources may be preserved while allowing the sourcing and decoding of the next media track to commence with sufficient time to enable gapless play.

Next, audio renderer filter 606 corresponding to the current audio track may detect an end-of-stream event, signaling the end of the current audio track. As described above, the end-of-stream event may correspond to the receipt of a last sample of the current audio track by the audio renderer filter.

Figure 7:
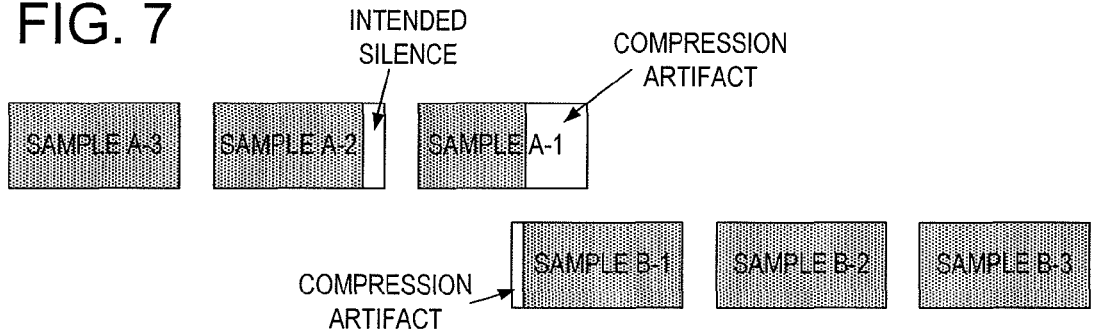
FIG. 7 shows a graphical depiction of compression artifacts in audio track samples.

Upon detecting the end-of-stream event, audio renderer filter 606 of the depicted embodiment performs two tasks related to gapless playback. First, audio renderer filter 606 removes a compression artifact from the current audio track, if present. As described above, a compression artifact may exist if an audio compression format utilizes fixed-length samples, and the audio track does not have enough data to exactly fill a last audio sample. In this case, one or more samples may be padded with silence. FIG. 7 shows a graphical depiction of compression artifacts in audio track samples. For example, a compression artifact may be a trailing silence at the end of the last sample of a current audio track, as shown at Sample A-1. Likewise, a compression artifact may also exist as a leading silence at the beginning of the first sample of the next audio track, as shown at Sample B-1. It is noted that a compression artifact is distinct from an intended silence, such as the intended silence in Sample A-2. Such an intended silence may be, for example, a silence added deliberately by a musical artist or composer, or an intended pause in a recording of a live performance. By removing a leading silence in a first sample and/or trailing silence in a last sample, the removal of intended silence may be avoided.

Returning to FIG. 6, in addition to removing compression artifacts from the final sample of the current audio track, the audio renderer filter 606 may further set a gapless audio event (GAE) 624 that triggers audio renderer filter 630 to render a plurality of samples of the next audio track. In this manner, samples of the next audio track that were previously sourced and decoded can immediately be rendered for playback, thereby enabling gapless play between the current audio track and the next audio track.

Figure 8:
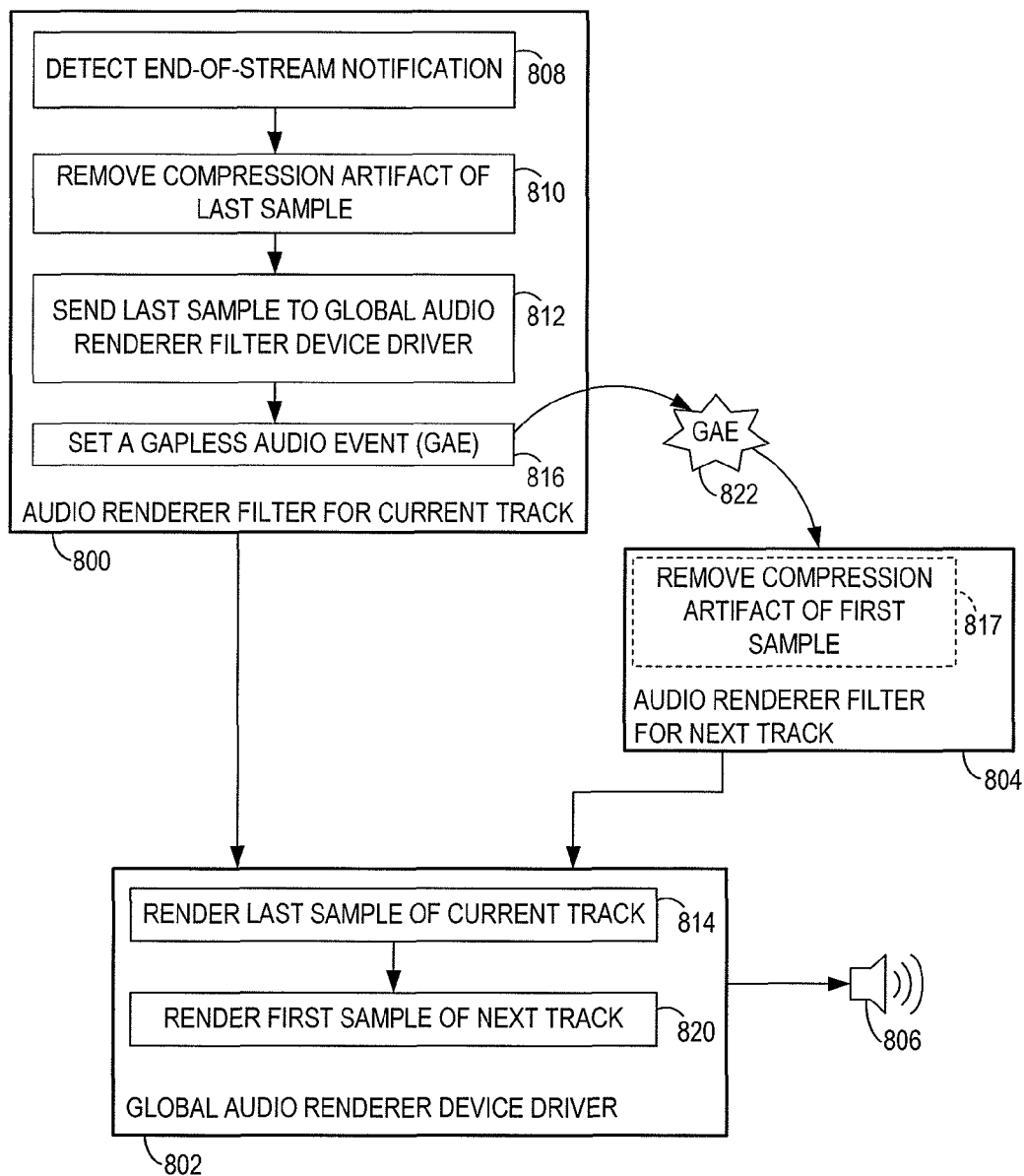
FIG. 8 shows a graphical depiction of another embodiment of a method of gapless playback of two or more audio tracks on a portable media device.

FIG. 8 shows a graphical depiction of another embodiment of a method of gapless playback of audio tracks on a portable media device. In this embodiment, a global audio renderer device handler may be used to further coordinate the rendering of a last sample of a current audio track followed by a first sample of the next audio track to yield a gapless transition between the two audio tracks.

Audio renderer filter 800 corresponding to the current audio track renders audio data by sending the data to a global audio renderer device handler 802. Global audio renderer device handler 802 is configured to receive data from an audio renderer filter 800 corresponding to the current audio track and an audio renderer filter 804 corresponding to the next audio track. As such, global audio renderer device handler 802 is configured to join data received from the audio renderer filter 800 corresponding to the current audio track and the audio renderer filter 804 corresponding to the next audio track into a single output yielding a continuous wave form.

As shown in FIG. 8, global audio renderer device handler 802 renders samples of a current audio track received from a current filter graph corresponding to a current audio track, and sends the samples to a speaker 806 to convert the rendered audio data into sound. As shown at 808, audio renderer filter 800 of the current filter graph may detect an end-of-stream event signaling the end of the current audio track. Upon detecting the end-of-stream event, audio renderer filter 800 may remove a compression artifact of the last sample of a current audio track, as shown at 810. Further, as shown at 812, upon removing the compression artifact, audio renderer filter 800 may then send the last sample of the current audio track to a global audio renderer device handler 802. As shown at 814, global audio renderer device handler 802 renders the last sample of the current audio track.

As shown at 816, audio renderer filter 800 sets a gapless audio event (GAE) 822. Upon being set, GAE 822 signals an audio renderer filter 804 corresponding to the next audio track to begin sending samples to global audio renderer device handler 802. As shown at 817, audio renderer filter 804 may remove a compression artifact from the first sample of the next audio track prior to sending the sample to global audio renderer device handler 802.

As shown at 820, global audio renderer device handler may then render a first sample of the next audio track. Thus, the global audio renderer device handler acts as a single flow channel to yield a continuous waveform when rendering a last sample of a current audio track followed by a first sample of the next audio track.

It will be appreciated that the computers and portable media devices described herein may be any suitable computing device or devices configured to execute the methods described herein. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above. The subject matter of the present disclosure includes all novel and non-obvious combinations and subcombinations of the various processes, systems and configurations, and other features, functions, acts, and/or properties disclosed herein, as well as any and all equivalents thereof.

The invention claimed is:

1. A computing device, comprising:
  a processor; and
  memory comprising instructions executable by the processor to:
    render a plurality of samples of a current audio track via a current filter graph;
    notify an end-of-stream soon event via the current filter graph;
    upon detecting the end-of-stream soon event, pre-roll a next filter graph, separate from the current filter graph, corresponding to a next audio track;
    pause the next filter graph after pre-rolling the next filter graph;
    notify an end-of-stream event at the current filter graph signaling an end of the current audio track; and
    upon detecting the end-of-stream event, render a plurality of samples of the next audio track via the next filter graph.

2. The computing device of claim 1, wherein the instructions are further executable to verify that the current audio track is an audio track before pre-rolling the next filter graph.

3. The computing device of claim 1, wherein the instructions are executable to pause the next filter graph by starting a delay timer that runs for a period based upon a determined remaining duration of the current audio track, and pausing the next filter graph after pre-rolling the next filter graph until the delay timer expires.

4. The computing device of claim 3, wherein the period based upon a determined remaining duration comprises a period equal to the determined remaining duration minus a predetermined delay.

5. The computing device of claim 4, wherein the predetermined delay comprises a delay of between 300-500 ms.

6. The computing device of claim 3, wherein the instructions are further executable to run the next filter graph after the delay timer expires but delay rendering of samples of the next audio track with the next filter graph until the end-of-stream event is detected.

7. The computing device of claim 1, further comprising instructions executable to remove, upon detecting the end-of-stream event, a compression artifact from the current audio track.

8. The computing device of claim 7, wherein the compression artifact is removed via an audio renderer filter corresponding to the current audio track, and wherein receipt of the end-of-stream event signals the audio renderer filter to trigger a gapless audio event after removing the compression artifact, the gapless audio event signaling commencement of a rendering of a first sample of the next audio track.

9. The computing device of claim 1, wherein the instructions are executable to render the plurality of samples of the current audio track by rendering the plurality of samples to a global audio renderer device handler configured to receive data from the current filter graph and the next filter graph to form a continuous output signal from the data from the current filter graph and the data from the next filter graph.

10. The computing device of claim 1, wherein the instructions are executable to set a gapless audio event upon detecting the end-of-stream event, wherein the gapless audio event triggers rendering of the plurality of samples of the next audio track.

11. The computing device of claim 10, wherein pausing the next filter graph comprises setting a delay timer based upon a remaining duration of the current audio track, and wherein setting the delay timer comprises resetting the gapless audio event.

12. A method of gapless playback of audio tracks on a portable media device, the method comprising:
  rendering a plurality of samples of a current audio track to a global audio renderer device handler;
  detecting an end-of-stream soon event via a source filter of a current filter graph corresponding to the current audio track;
  pre-rolling a next filter graph corresponding to a next audio track upon detecting the end-of-stream soon event;
  pausing the next filter graph after pre-rolling the next filter graph;
  detecting an end-of-stream event signaling an end of the current audio track via an audio renderer filter of the current filter graph;
  removing a compression artifact from the current audio track; and
  rendering a plurality of samples of the next audio track to the global audio renderer device handler.

13. The method of claim 12, further comprising verifying that the current audio track is an audio track before pre-rolling the next audio track.

14. The method of claim 12, wherein pausing the next filter graph comprises starting a delay timer for a period based upon a determined remaining duration of the current audio track and pausing the next filter graph after pre-rolling the next filter graph until the delay timer expires.

15. The method of claim 12, wherein the compression artifact is removed via the audio renderer filter of the current filter graph.

16. The method of claim 12, further comprising setting a gapless audio event upon detecting the end-of-stream event, the gapless audio event signaling the next filter graph to begin rendering the samples of the next audio track and also signaling a resetting of a delay timer used to control a pause duration of the next filter graph.

17. The method of claim 12, wherein upon confirming that a prenegotiated media type and memory allocation requirements are met, the global audio renderer device handler is configured to act as a single flow channel to yield a continuous waveform by joining data received from an audio renderer filter corresponding to the current audio track and an audio renderer filter corresponding to the next audio track into a single output.

18. A method of gapless playback of audio tracks on a portable media device, the method comprising:
  rendering a plurality of samples of a current audio track;
  detecting an end-of-stream soon event via a source filter corresponding to the current audio track;
  determining a remaining duration of the current audio track;
  verifying that the current audio track is an audio track;
  identifying a next audio track;
  starting a preroll delay timer of a predetermined preroll delay amount;
  upon expiration of the preroll delay timer, pre-rolling a next filter graph corresponding to the next audio track;
  starting a delay timer for a period based upon the remaining duration of the current audio track;
  pausing the next filter graph until the delay timer expires;
  resetting a gapless audio event;
  detecting an end-of-stream event signaling an end of the current audio track;
  upon detecting the end-of-stream event, removing a compression artifact from the current audio track; and
  setting the gapless audio event that triggers rendering of a plurality of samples of the next audio track.

19. The method of claim 18, wherein the global audio renderer device handler is configured to receive data from an audio renderer filter corresponding to the current audio track and an audio renderer filter corresponding to the next audio track, the global audio renderer device handler providing a single open instance for data to be rendered to a speaker.

20. The method of claim 18, wherein the period based upon the determined remaining duration comprises a period equal to the determined remaining duration minus a predetermined delay.

* * * * *